United States Patent [19]

Kaneko

[11] Patent Number: 5,072,607
[45] Date of Patent: Dec. 17, 1991

[54] BRAKE BOOSTER-MOUNTING INSTRUCTION

[75] Inventor: Kiyokazu Kaneko, Saitama, Japan

[73] Assignee: Akebono Brake Industry Co., Ltd., Tokyo, Japan

[21] Appl. No.: 654,024

[22] Filed: Feb. 12, 1991

[30] Foreign Application Priority Data

Feb. 13, 1990 [JP] Japan .................... 2-31968

[51] Int. Cl.$^5$ .................... F01B 29/00; F15B 9/15
[52] U.S. Cl. .................... 92/161; 92/98 R; 91/376 R
[58] Field of Search ............... 92/96, 98 R, 146, 161; 91/376 R, 369.2; 248/222.2

[56] References Cited

U.S. PATENT DOCUMENTS

| 2,574,700 | 4/1951 | Knauss | 92/161 |
| 4,402,256 | 9/1983 | Ando | 91/369.2 |
| 4,632,014 | 12/1986 | Endo | 91/369.2 |
| 4,658,660 | 4/1987 | Parker | 248/222.2 |
| 4,779,515 | 10/1988 | Staub, Jr. | 92/161 |
| 4,784,046 | 10/1988 | Gautier | 92/128 |
| 5,012,998 | 5/1991 | Gautier et al. | 92/161 |

FOREIGN PATENT DOCUMENTS 63-71472 3/1988 Japan .

Primary Examiner—John T. Kwon
Assistant Examiner—Hoang Nguyen
Attorney, Agent, or Firm—Finnegan, Henderson, Farabow, Garrett, and Dunner

[57] ABSTRACT

A brake booster-mounting construction includes a reinforcement plate which is adapted to be fastened, jointly with a shell, to a fixing member by stud bolts extending outwardly from a shell wall. The brake booster-mounting construction is characterized in that; in its non-mounted condition, the reinforcement plate is abutted against an outer peripheral portion of said shell, and also that portion of the reinforcement plate to be jointly fastened by the stud bolts is spaced from the shell; and in its mounted condition, the reinforcement plate spring-urges a brake booster in a direction away from the fixing member.

2 Claims, 1 Drawing Sheet

BRAKE BOOSTER-MOUNTING INSTRUCTION

BACKGROUND OF THE INVENTION

This invention relates to a brake booster-mounting construction, and more particularly to a brake booster-mounting construction suited for mounting an automobile brake booster on a vehicle.

A brake booster converts a pressing-down force of a brake pedal into a boosting force, utilizing an intake negative pressure, and transmits it to a master cylinder. In such a brake booster, one wall portion of a shell is fixedly secured to a vehicle body, and a master cylinder block is mounted on other wall portion of the shell. In this conventional mounting construction, stud bolts are formed on and protruded from a rear shell (which is adapted to face the vehicle body) and a front shell (which is adapted to face the master cylinder), and these stud bolts are passed respectively into the vehicle body and the master cylinder and are fastened thereto by nuts.

In the above conventional brake booster, the shell is formed by pressing a thin steel sheet into a required shape in order to achieve a lightweight construction. When a heavy part, such as an anti-lock brake system provided integrally with the master cylinder, is incorporated in the shell, a problem of durability due to vibrations has arisen. More specifically, in the brake booster, usually, the rear shell is fixedly secured to the vehicle body, and the front shell is fixedly connected to the master cylinder. In such a mounting construction, when vibrations of the vehicle act on the heavy part, the vibrations concentrate on the portion of connection between the rear shell (which is fixedly connected to the vehicle) and the stud bolts. Therefore, it is necessary to increase a vibration-resistant strength particularly at the rear shell side so as to provide a sufficient reinforcement. In view of this, Japanese Laid-Open (Kokai) Patent Application No. 71472/88 proposes a construction of the type in which a rear shell side is fastened to a vehicle body via a reinforcement member provided within a minor diameter portion. With this brake booster-mounting construction, however, vibrations can not still be suppressed, and the rattling due to the loosening of stud bolts can not be reduced.

SUMMARY OF THE INVENTION

With the above deficiencies of the prior art in view, it is an object of this invention to provide a brake booster-mounting construction which can improve vibration-insulating properties without changing the construction of a brake booster, and has a flexibility in design.

The above object has been achieved by a brake booster-mounting construction comprising a reinforcement plate which is adapted to be fastened, jointly with a shell, to a fixing member by stud bolts extending outwardly from a shell wall, CHARACTERIZED in that in its non-mounted condition, said reinforcement plate is abutted against an outer peripheral portion of said shell, and also that portion of said reinforcement plate to be jointly fastened by said stud bolts is spaced from said shell; and in its mounted condition, said reinforcement plate spring-urges a brake booster in a direction away from said fixing member.

With this construction, when the brake booster of the conventional mass-production type is to be mounted, the stud bolts on the rear shell side are passed through bolt holes formed through the reinforcement plate, and in this condition the brake booster is mounted on a vehicle body. Then, the shell and the reinforcement plate are jointly fastened to a mounting plate of the vehicle body by the stud bolts and nuts. By this fastening operation, the reinforcement plate is clamped between the shell and the mounting plate. The reinforcement plate has a portion that can be flexed, and the outer peripheral portion of the reinforcement plate abutted against the shell serves to spring-urge the shell in a direction away from the mounting plate of the vehicle body. This performs the function of preventing the connection between the stud bolts and the nuts from becoming loosened, and at the same time absorbs vibrations, acting on the brake booster, because of its spring action. Therefore, even when anti-lock brake system provided integrally with a master cylinder is incorporated in the brake booster, adequate vibration-resistance properties can be obtained.

DESCRIPTION OF THE PREFERRED EMBODIMENT OF THE INVENTION

A preferred embodiment of a brake booster-mounting construction of the present invention will now be described in detail with reference to the drawings.

Figure 1:
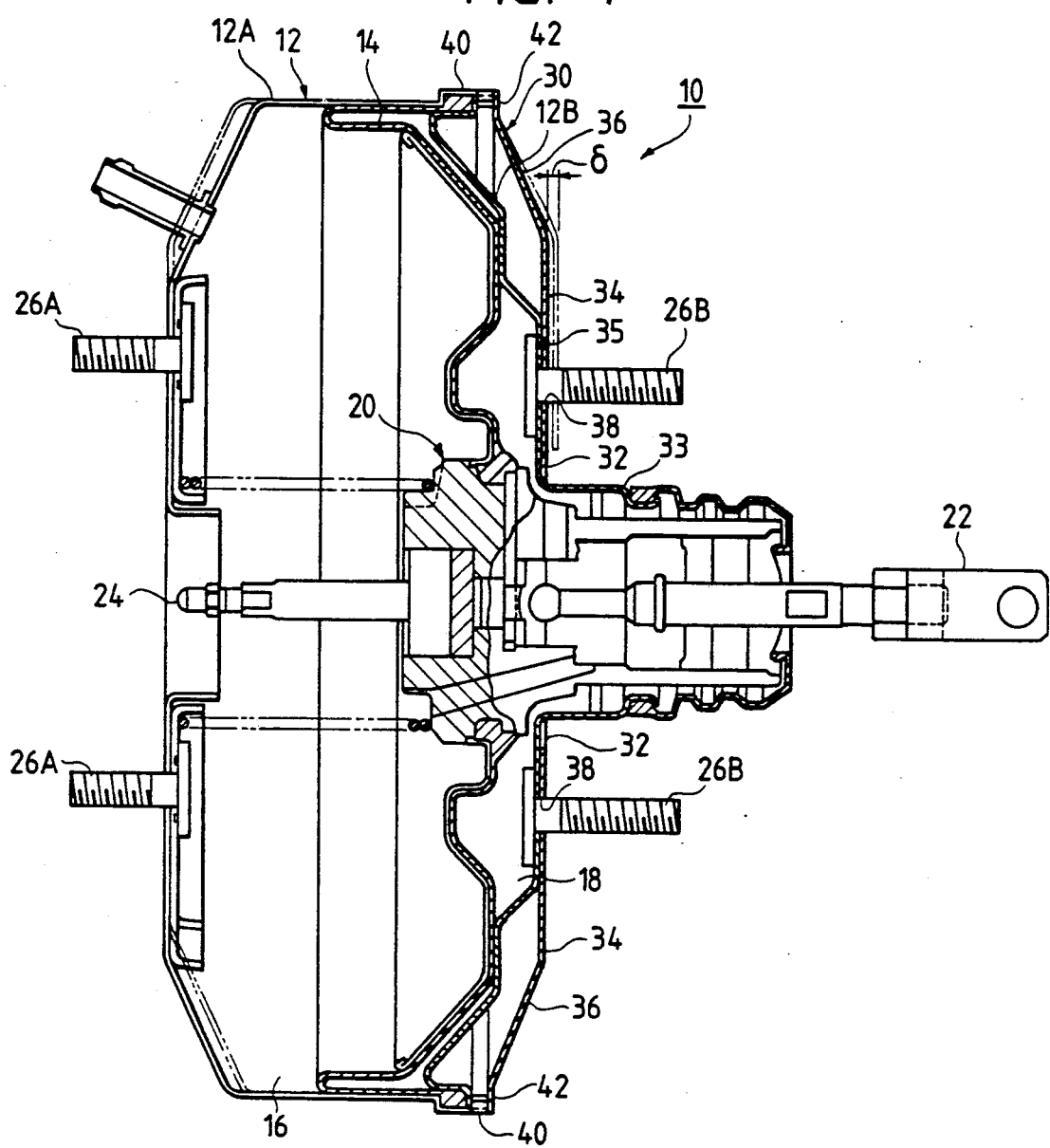
FIG. 1 is a cross-sectional view of a brake booster-mounting construction provided in accordance with the present invention.
Figure 2:
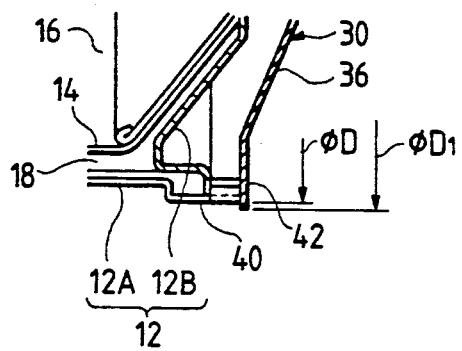
FIG. 2 is a cross-sectional view of an outer peripheral portion of a shell.
Figure 3:
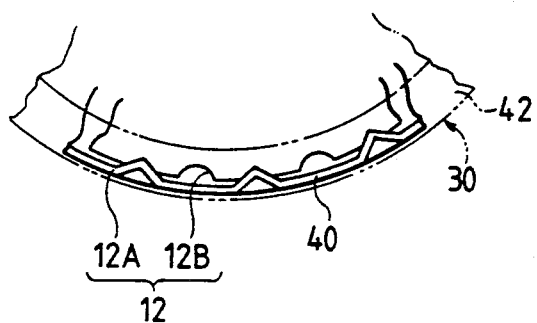
FIG. 3 is a plan view of part of that portion shown in FIG. 2.

FIG. 1 is a cross-sectional view of the brake booster-mounting construction provided in accordance with the present invention. As shown in FIG. 1, a brake booster 10 comprises a shell (container member) 12 composed of a front shell 12A and a rear shell 12B, and a diaphragm 14 dividing the interior of the shell 12 into a constant pressure chamber 16 and a variable pressure chamber 18. A valve body 20 extends through the central portion of the rear shell 12B, and is attached to the central portion of the diaphragm 14. An operating rod 22 operable in response to the movement of a brake pedal is connected to the valve body 20 so as to move axially. A push rod 24 connected to a master cylinder is connected to the opposite side of the valve body 20. An engine intake negative pressure can be introduced into the constant pressure chamber 16 and the variable pressure chamber 18, and normally the two chambers are in communication with each other via the valve body 20. When the operating rod 22 is pushed in response to the movement of the brake pedal, this rod switches passages within the valve body 20 to feed the atmosphere into the variable pressure chamber 18 so as to create a pressure differential between the two chambers, thereby increasing a pushing force acting on the push rod 24.

In the above brake booster 10, four stud bolts 26A are mounted on the front shell 12A and are circumferentially spaced from one another at equal intervals on a circle having its center disposed at that portion of the front shell 12A through which the push rod 24 extends. Similarly, four stud bolts 26B are mounted on the rear shell 12B and are circumferentially spaced from one another at equal intervals on a circle having its center disposed at that portion of the rear shell 12B through which the operating rod 22 extends. For reinforcing purposes, a front reinforcement plate 28 is fastened between the inner surface of the front shell 12A and the heads of the front stud bolts 26A, and the shanks of the front stud bolts 26A are extended exteriorly of the front shell 12A. The heads of the rear stud bolts 26B are disposed within the variable pressure chamber 18, and these stud bolts are welded to the rear shell 12B in such a manner that their shanks extend exteriorly of the rear shell 12B in parallel relation to the operating rod 22. The brake booster 10 having the stud bolts 26 (26A, 26B) is fixedly mounted through the stud bolts 26B, and particularly the rear stud bolts 26B are passed through and fixedly fastened to a mounting plate (not shown) of a vehicle body.

In this embodiment, when the brake booster 10 is to be mounted on the vehicle body, the rear stud bolts 26B formed integrally with the rear shell 12B are passed through the mounting plate of the vehicle body, and are fastened at a mounting surface 35. This mounting surface 35 cooperates with the mounting plate to fasten the rear reinforcement plate 30 therebetween. The rear reinforcement plate 30 is made of a dish-shaped plate which has a central hole 32 through which a boss portion 33 of the rear shell 12B receiving the valve body 20 therein is passed. The rear reinforcement plate 30 also has a flat portion (jointly-fastening portion) 34 mated with the mounting surface 35 of the rear shell 12B, and an inclined surface 36 extending from the periphery of the flat portion 34 toward the outer periphery of the shell 12 where the front and rear shells 12A and 12B are joined together. Holes 38 for passing the rear stud bolts 26B therethrough are formed through the flat portion 34 of the rear reinforcement plate 30, and the rear reinforcement plate 30 is fastened, together with the rear shell 12B, to the mounting plate (not shown) of the vehicle body by the stud bolts 26B and nuts threaded thereon. As described above, the outer peripheral portion of the rear reinforcement plate 30 are inclined toward the outer periphery of the shell 12, and is abutted against an open tubular portion 40 of the front shell 12A which receives the rear shell 12B. For this reason, a flange portion 42 which is parallel to the flat portion 34 is formed at the outer peripheral portion of the rear reinforcement plate 30, and this flange portion 42 serves as a shell abutment portion.

The rear reinforcement plate 30 can be flexed by an amount δ so that when the brake booster 10 is to be attached to the mounting plate of the vehicle body, the rear reinforcement plate 30 can urges the brake booster in a direction away from this mounting plate. More specifically, the rear reinforcement plate 30 has a dish-shape such that the distance between the flat portion 34 and the flange portion 42 in a free condition of the rear reinforcement plate 30 differs from that in its fastened condition. When the rear reinforcement plate 30 is fastened to the mounting plate of the vehicle body, it is flexed by an amount δ, so that the flange portion 42 spring-urges the outer periphery of the shell 12 of the brake booster 10 away from the mounting plate of the vehicle body.

In the above brake booster-mounting construction, the rear reinforcement plate 30 is first attached to the rear shell 12B. This is done by passing the rear stud bolts 26B respectively through the bolt passing holes 38 formed through the rear reinforcement plate 30. In this condition, the rear stud bolts 26B are passed through bolts holes formed through the mounting plate of the vehicle body, and nuts are threaded on these stud bolts at the reverse side of this mounting plate, so that the rear reinforcement plate 30 is fastened between the mounting plate of the vehicle body and the rear shell 12B, and also the rear shell 12B is fastened. When this fastening is done, a spring force P corresponding to the flexed amount δ is applied to the flange portion 42 at the outer peripheral portion of the rear reinforcement plate 30, since the rear reinforcement plate 30 can be flexed by an amount 6 because the distance between the flat portion 34 and the open tubular portion 40 of the front shell 12A is greater than the distance between the mounting surface 35 of the rear shell 12B and the open tubular portion 40. This spring force P urges the shell 12 away from the mounting plate of the vehicle body. As a result, the rear reinforcement plate 30 serves to absorb backlashes developing between the rear stud bolts 26B and the nuts, and also serves to absorb vibrations from the master cylinder, connected to the front shell 12A, because of its spring function. Therefore, the vibration resistant properties of the brake booster 10 are enhanced, and besides this can be done without changing the construction of the brake booster 10. Therefore, the brake booster 10 of the conventional type can be mounted on the vehicle with a higher durability.

In the above embodiment, although the spring-urging reinforcement plate is provided on the rear side, it can be provided on the front side if necessary.

As described above, in the brake booster-mounting construction of the present invention, the reinforcement plate is fastened, jointly with the brake booster, to the vehicle, and also produces the spring force when it is mounted on the vehicle, thus providing a preload so as to enhance the fastening forces of the stud bolts. Therefore, there can be achieved excellent advantages that no rattling is encountered, that the durability can be enhanced, and that the reinforcement effect can be attained without the need for changing the construction of the brake booster.

What is claimed is:

1. A brake booster-mounting construction comprising:
   stud bolts extending outwardly from a shell of the brake booster; and
   a reinforcement plate adapted to be fastened, jointly with said shell, to a fixing member of a vehicle body by said stud bolts; wherein
   in its non-mounted condition, said reinforcement plate is abutted against an outer peripheral portion of said shell, and also that portion of said reinforcement plate to be jointly fastened by said stud bolts is spaced from said shell; and
   in its mounted condition, said reinforcement plate spring-urges the brake booster in a direction away from said fixing member.

2. A brake booster-mounting construction according to claim 1, wherein said reinforcement plate comprising:
   a flat portion having holes for passing said stud bolts;
   a flange portion provided to an outer peripheral portion of said reinforcement plate, said flange portion being abutted against said shell; and
   an inclined portion extending from said flat portion to said flange portion.

* * * * *

UNITED STATES PATENT AND TRADEMARK OFFICE
CERTIFICATE OF CORRECTION

PATENT NO. : 5,072,607
DATED     : December 17, 1991
INVENTOR(S) : Kiyokazu Kaneko It is certified that error appears in the above-identified patent and that said Letters Patent is hereby corrected as shown below:

On the title page and Column 1, line 1, change " INSTRUCTION" to --CONSTRUCTION --.

Signed and Sealed this

Twentieth Day of July, 1993

Attest:

MICHAEL K. KIRK

Attesting Officer    Acting Commissioner of Patents and Trademarks